United States Patent
Koppal et al.

(10) Patent No.: US 8,330,802 B2
(45) Date of Patent: Dec. 11, 2012

(54) STEREO MOVIE EDITING (75) Inventors: Sanjeev J. Koppal, Seattle, WA (US);
Sing Bing Kang, Redmond, WA (US);
Charles Lawrence Zitnick, III, Seattle, WA (US); Michael F. Cohen, Seattle, WA (US); Bryan Kent Ressler, Sammamish, WA (US)

(73) Assignee: Microsoft Corp., Redmond, WA (US)

( * ) Notice: Subject to any disclaimer, the term of this patent is extended or adjusted under 35 U.S.C. 154(b) by 903 days.

(21) Appl. No.: 12/331,419

(22) Filed: Dec. 9, 2008

(65) Prior Publication Data
US 2010/0142801 A1 Jun. 10, 2010

(51) Int. Cl.
*H04N 13/02* (2006.01)

(52) U.S. Cl. .......................................................... 348/46

(58) Field of Classification Search ........................ None
See application file for complete search history.

(56) References Cited

U.S. PATENT DOCUMENTS

| | | | |
|---|---|---|---|
| 4,168,885 A | 9/1979 | Kent et al. | |
| 5,576,844 A | 11/1996 | Anderson et al. | |
| 5,953,054 A * | 9/1999 | Mercier | 348/50 |
| 5,977,978 A * | 11/1999 | Carey et al. | 345/419 |
| 6,088,006 A * | 7/2000 | Tabata | 345/7 |
| 6,226,000 B1 * | 5/2001 | Richens et al. | 345/419 |
| 6,262,743 B1 * | 7/2001 | Allio | 345/427 |
| 6,473,731 B2 | 10/2002 | Hinderks | |
| 6,574,042 B2 * | 6/2003 | Allio | 359/463 |
| 7,058,204 B2 * | 6/2006 | Hildreth et al. | 382/103 |
| 7,088,364 B2 | 8/2006 | Lantin | |
| 7,180,536 B2 | 2/2007 | Wolowelsky et al. | |
| 7,421,093 B2 * | 9/2008 | Hildreth et al. | 382/103 |
| 7,444,013 B2 * | 10/2008 | Chen | 382/154 |
| 7,471,292 B2 * | 12/2008 | Li | 345/427 |
| 7,555,142 B2 * | 6/2009 | Hildreth et al. | 382/103 |
| 7,977,906 B1 * | 7/2011 | Srinivasa et al. | 318/561 |
| 2002/0021832 A1 | 2/2002 | Dawson | |
| 2002/0054207 A1 * | 5/2002 | Iizuka et al. | 348/54 |
| 2003/0072483 A1 * | 4/2003 | Chen | 382/154 |
| 2003/0160864 A1 * | 8/2003 | Kremen | 348/51 |

(Continued)

FOREIGN PATENT DOCUMENTS

WO 2006043016 A1 4/2006

OTHER PUBLICATIONS

Adedoyin, S., W.A.C. Fernando, A. Aggoun, K. M. Kondoz, Motion and disparity estimation with self adapted evolutionary strategy in 3D video coding, IEEE Transactions on Consumer Electronics, Nov. 2007, pp. 1768-1775, vol. 53, No. 4.

Computational Engineering International, Inc., EnVe—Edit your videos, Oct. 15, 2008, pp. 1-5, http://www.ensight.com/index2.php?option=com_content&do_pdf=1&id=103.

Ilgner, J., J. J.-H. Park, D. Labbé, M. Westhofen, Using a high-definition stereoscopic video system to teach microscopic surgery, Proc. of SPIE, Stereoscopic Displays and Virtual Reality Systems XIV, Jan. 2007, vol. 6490.

(Continued)

*Primary Examiner* — Jerry Dennison
(74) *Attorney, Agent, or Firm* — Lyon & Harr, LLP; Katrina A. Lyon (57) ABSTRACT

The stereo movie editing technique described herein combines knowledge of both multi-view stereo algorithms and human depth perception. The technique creates a digital editor, specifically for stereographic cinema. The technique employs an interface that allows intuitive manipulation of the different parameters in a stereo movie setup, such as camera locations and screen position. Using the technique it is possible to reduce or enhance well-known stereo movie effects such as cardboarding and miniaturization. The technique also provides new editing techniques such as directing the user's attention and easier transitions between scenes.

20 Claims, 6 Drawing Sheets

U.S. PATENT DOCUMENTS

| | | | |
|---|---|---|---|
| 2005/0081161 A1* | 4/2005 | MacInnes et al. | 715/765 |
| 2005/0084232 A1 | 4/2005 | Herberger et al. | |
| 2005/0089212 A1* | 4/2005 | Mashitani et al. | 382/154 |
| 2005/0117215 A1* | 6/2005 | Lange | 359/462 |
| 2005/0140670 A1* | 6/2005 | Wu et al. | 345/419 |
| 2005/0147309 A1 | 7/2005 | Katata et al. | |
| 2006/0023228 A1* | 2/2006 | Geng | 356/601 |
| 2006/0038879 A1* | 2/2006 | Kremen | 348/51 |
| 2006/0072175 A1* | 4/2006 | Oshino | 358/537 |
| 2006/0150072 A1 | 7/2006 | Salvucci | |
| 2006/0158730 A1* | 7/2006 | Kira | 359/462 |
| 2006/0165310 A1* | 7/2006 | Mack | 382/284 |
| 2006/0204239 A1* | 9/2006 | Inaba | 396/325 |
| 2007/0126863 A1* | 6/2007 | Prechtl et al. | 348/43 |
| 2007/0183650 A1 | 8/2007 | Lipton et al. | |
| 2007/0263924 A1* | 11/2007 | Kochi et al. | 382/154 |
| 2008/0297593 A1 | 12/2008 | Debevec et al. | |
| 2009/0009592 A1* | 1/2009 | Takata et al. | 348/47 |
| 2009/0153648 A1* | 6/2009 | Quennesson | 348/43 |
| 2009/0219283 A1* | 9/2009 | Hendrickson et al. | 345/420 |
| 2009/0226080 A1* | 9/2009 | Boyd et al. | 382/154 |
| 2009/0237492 A1* | 9/2009 | Kikinis et al. | 348/47 |
| 2009/0237564 A1* | 9/2009 | Kikinis et al. | 348/584 |
| 2009/0262184 A1* | 10/2009 | Engle et al. | 348/47 |
| 2010/0085351 A1* | 4/2010 | Deb et al. | 345/419 |
| 2010/0111417 A1* | 5/2010 | Ward et al. | 382/173 |
| 2010/0111489 A1* | 5/2010 | Presler | 386/52 |
| 2010/0142801 A1* | 6/2010 | Koppal et al. | 382/154 |
| 2010/0182406 A1* | 7/2010 | Benitez | 348/46 |
| 2010/0194862 A1* | 8/2010 | Givon | 348/49 |
| 2010/0318914 A1* | 12/2010 | Zitnick et al. | 715/719 |
| 2011/0090217 A1* | 4/2011 | Mashitani et al. | 345/419 |
| 2011/0142309 A1* | 6/2011 | Zhang et al. | 382/128 |

OTHER PUBLICATIONS

Jones, A., I. McDowall, H. Yamada, M. T. Bolas, P. E. Debevec, Rendering for an interactive 360 degree light field display, ACM Trans. Graph., Jul. 2007, vol. 26, No. 3.

Kim, H. J., J. W. Choi, A.-J. Chaing, and K. Y. Yu, Reconstruction of stereoscopic imagery for visual comfort, Proc. of the SPIE, Stereoscopic Displays and Virtual Reality Sys's XIX, Apr. 2008, vol. 6803.

Lambooij, M. T. M., W. A. Ijsselsteijn, I. Heynderickx, Visual discomfort in stereoscopic displays: A review, Proc. of the SPIE, Stereoscopic Displays and Virtual Reality Sys's XIV, Feb. 2007, vol. 6490.

Matusik, W., H. Pfister, 3D TV: A scalable system for real-time acquisition, transmission, and autostereoscopic display of dynamic scenes, ACM Trans. Graph., Aug. 2004, vol. 23, No. 3, pp. 814-824.

Schwerdtner, A., H. Heidrich, The Dresden 3D Display (D4D), Proc. of SPIE, Stereoscopic Displays and Virtual Reality Systems V, Apr. 1998, vol. 3295, pp. 203-210.

Wheatstone, C., Contributions to the Physiology of Vision—Part the First: On some remarkable, and hitherto unobserved, Phenomena of Binocular Vision, King's College, London, Jun. 21, 1838.

Wikipedia Contributors, Artificial Reality, Wikipedia, The free encyclopedia, http://en.wikipedia.org/wiki/Artificial_reality, accessed Apr. 7, 2009.

Zitnick, C. L., S. B. Kang, M. Uyttendaele, S. A. J. Winder, R. Szeliski, High-quality video view interpolation using a layered representation, ACM Trans. Graph., Aug. 2004, vol. 23, No. 3, pp. 600-608.

* cited by examiner

STEREO MOVIE EDITING

BACKGROUND

Editing a movie is an art form in itself. Manipulating the timeline to tell a story makes films different from other visual art forms such as photography or painting. An important aspect of movie editing is setting up transitions between movie clips. This is especially true because transitions between clips have increased dramatically since the early days of cinema. Movie content today can easily have multiple cuts per second.

Telling a story through film requires control over shot sequences, scene transitions and special effects. Although current traditional digital movie editors provide many sophisticated tools, these tools do not easily extend to three dimensional (3D) movies. Stereoscopic or 3D cinema demands unique editing techniques because it is fundamentally different from a traditional film in that typically two images are viewed to create a perception of viewing a 3D scene. In stereoscopic video a person's eyes converge on an object, and the muscles that control that person's optics give absolute depth of the object. The person's brain has the ability to perceive depth from two images of the scene taken from slightly different viewpoints. This is known as fusion, since the brain perceives a single image of the scene with depth rather than "double vision". Fusion occurs in a region of the brain known as Panum's area, giving relative depth around a point called the vergence point.

There are many challenges that are unique to the stereo movie setup. Stereo movies allow a viewer's eyes to wander about the scene, much like reality. Therefore, significant efforts must be taken to focus the audience's attention. If scene transitions are not designed carefully, fusion may break down between cuts as the audience takes time to adjust. There are also biological limits to what can be fused, and objects too close to the viewer will be perceived as double. Additionally, shots taken with a large camera baseline or with vertical disparity may cause headaches and discomfort. However, the potential to create a visually stunning experience in stereoscopic cinema outweighs the extra work needed to overcome these challenges. Stereo movies thrill audiences: cliffs bring real vertigo, monsters are close enough to touch and jewelry sparkles with head movement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The stereo movie editing technique described herein combines knowledge of both multi-view stereo algorithms and human depth perception. The technique includes a digital editor specifically for stereographic cinema. The technique further employs a user interface that allows intuitive manipulation of the different parameters in a stereo movie setup, such as camera locations and screen position. Using the technique it is possible to reduce or enhance well-known stereo movie effects such as cardboarding and miniaturization. The technique also provides new editing techniques such as directing the user's attention and allows for easier transitions between scenes.

In the following description of embodiments of the disclosure, reference is made to the accompanying drawings which form a part hereof, and in which are shown, by way of illustration, specific embodiments in which the technique may be practiced. It is understood that other embodiments may be utilized and structural changes may be made without departing from the scope of the disclosure.

DESCRIPTION OF THE DRAWINGS

The specific features, aspects, and advantages of the disclosure will become better understood with regard to the following description, appended claims, and accompanying drawings where:

FIG. 1 depicts a stereo set up with a rectified stereo camera and a pair of eyes. Here the disparities created are shown when a rectified stereo pair view a point P. The point $P_e$ is the perceived location of P when viewed by the eyes on the right.

FIG. 4 shows what the user sees for a selected frame.

DETAILED DESCRIPTION

In the following description of the stereo movie editing technique, reference is made to the accompanying drawings, which form a part thereof, and which show by way of illustration examples by which the stereo movie editing technique described herein may be practiced. It is to be understood that other embodiments may be utilized and structural changes may be made without departing from the scope of the claimed subject matter.

1.0 Stereo Movie Editing Technique.

The following section provides an explanation of known stereo effects and the relationship between stereo movie effects and camera geometry. An exemplary operating environment and the computations used for providing special 3D effects created by the stereo movie editing technique are then provided. An exemplary architecture wherein the technique can be practiced and an exemplary process employing the technique are then detailed. Finally, two exemplary user interfaces of the stereo movie editing technique are described.

1.1 Overview of Stereo Movie Effects

Classical thinkers such as Euclid and Galen, as well as Renaissance scientists such as Kepler and Aguilonius, had pondered the problem of how humans perceive depth. However, most literature agrees that Wheatstone discovered stereopsis and was the first to define the term "disparity" in terms of differences in subtended angles. Wheatstone showed that the mind perceives an object of three dimensions from two slightly dissimilar pictures projected by it on the two retinae of the eyes. Following this work, Brewster, in 1844, built the first stereoscope that allowed a viewer to perceive two images as one three dimensional image. Soon Helmholtz and Rollman brought about the anaglyph. Anaglyph images are used to provide a 3D effect, when viewed with 2 color glasses where each lens is a different color. Anaglyph images are made up of two color layers, superimposed, but offset with respect to each other to produce a depth effect. The anaglyph picture contains two differently filtered colored images, one for each eye. When viewed through the anaglyph glasses, an integrated stereoscopic image is revealed. A polarized format was introduced by Norling in the United States and Spottiswoode in Britain in the 1940s. Polarized 3D glasses create the illusion of three-dimensional images by restricting the light that reaches each eye. To present a stereoscopic motion picture, two images are projected superimposed onto the same screen through orthogonal polarizing filters. The viewer wears low-cost eyeglasses which also contain a pair of orthogonal polarizing filters. As each filter only passes light which is similarly polarized and blocks the orthogonally polarized light, each eye only sees one of the images, and the 3D effect is achieved. These and other innovations fueled a boom in 3D movies in the 50s, which was followed by a chequered run of popularity to the current day.

A stereo movie experience is created by the complex combination of many factors, such as camera parameters, viewing location, projector-screen configuration and individual capacity for vergence and fusion. Depending on how these vary, the viewing outcome can range from pleasant to painful or even breakdown in fusion (double vision). Valuable practical knowledge and heuristics are known to the community of 3D film-makers to avoid or enhance well-known effects. A good stereo movie editor must be able to model the geometry and internal parameters of capture devices (cameras), display devices (projectors or 3D screens) as well as human issues such as the limits of perception and audience format (single viewer or multiple seating).

1.2 Exemplary Operating Environment and Computations of Stereo Movie Effects Usable in the Stereo Movie Editing Technique.

Figure 1:
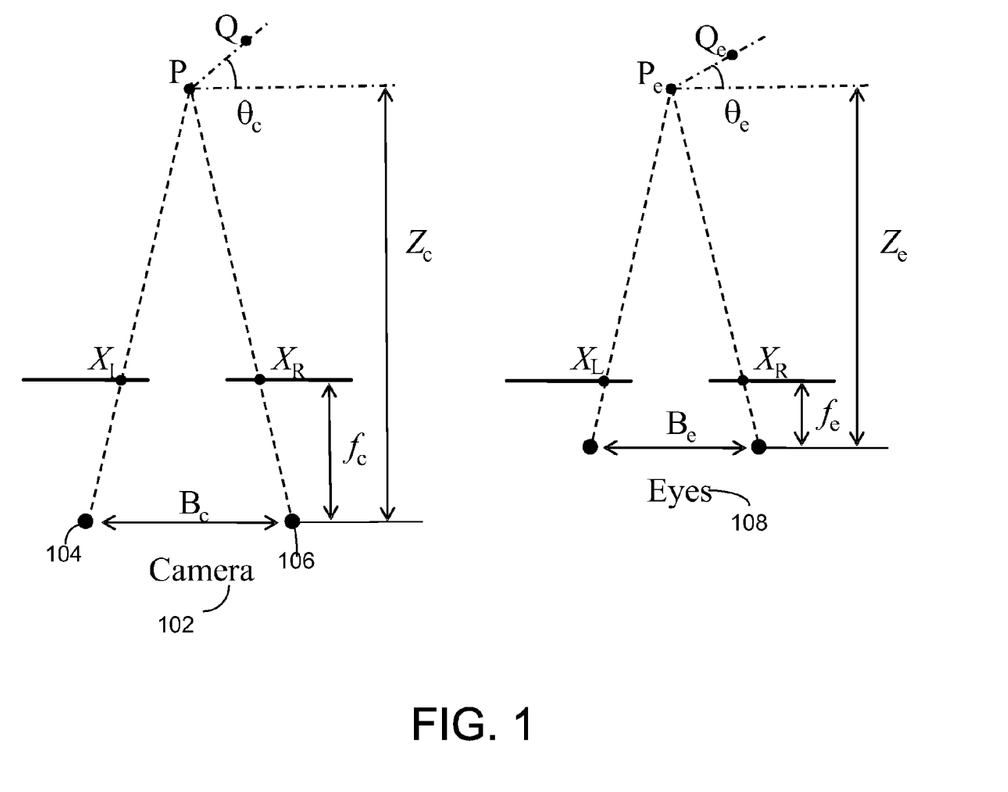
FIG. 1 provides an overview of one possible environment in which the stereo movie editing technique described herein can be practiced.

The stereo movie editing technique described herein creates a digital editor specifically for stereographic cinema. More specifically, the stereo movie editing technique described herein is a tool that will allow new and interesting ways of making and viewing 3D movies. The technique employs the relationship between human perception and the geometry of a rectified stereo setup, as shown in FIG. 1. Rectified means that the original images are processed to produce epipolar geometry that maps horizontal scan lines in one image to similarly located horizontal scan lines in the other corresponding image. The stereo camera 102 consisting of two cameras 104, 106 and the eyes 108 are approximated by pinhole cameras and the images taken by the camera 102 are directly transferred to the eye image plane. The technique starts with a well-known relationship between depth and disparity:

$$d = \frac{Bf}{Z}, \quad (1)$$

where Z is the depth, d is disparity, B is the distance between the cameras of the stereo camera 102 (interocular distance or baseline) and f is the focal length.

In one embodiment of the stereo movie editing technique, the technique employs the relationship of how the depths and angles between two points, P and Q, change in a simplified stereo movie setup. Both cameras are rectified, as shown on the left of FIG. 1. They have the same focal length $f_c$ and distance between the cameras (i.e., interocular or baseline) is $B_c$. The eyes 108 are shown on the right of FIG. 1 and are also rectified. They have a different focal length $f_e$ and distance between them is $B_e$. In this simplified model, the images of P, $X_L$, and $X_R$ are identical in the two pairs. The perceived locations of the points in the eyes are $P_e$ and $Q_e$. $X_L$ and $X_R$ are the x-coordinate locations of the left and right projections (respectively) of the 3D point P.

Given this configuration, it is possible to predict how changes in various parameters in the camera configuration are perceived by a human. The knowledge of these perceptions can then be used in the stereo movie editing technique to create special effects. For example, let $P=(p_x,p_y,p_z)$, $Q=(q_x, q_y, q_z)$, $P_e=(p_{x,e},p_{y,e},p_{z,e})$, and $Q_e=(q_{x,e},q_{y,e},q_{z,e})$. For any point, there exist the following relationships: change in depth, change in x coordinates, and change in surface orientation. These relationships are more specifically defined below.

Change in Depth Z.

The change in the depth can be expressed as the ratio of the Z coordinate follows from the stereo equation $$\frac{Z_c}{Z_e} = \frac{B_c f_c}{B_e f_e} \quad (2)$$

Change in X Coordinates.
From similar triangles in FIG. 1, $$\frac{f_c}{X_L} = \frac{Z_c}{X_L + X_R}. \quad (3)$$

Since the images in the eye and the cameras are the same, the change in x coordinates can be computed as $$\frac{(X_L + X_R)f_c}{Z_c} = X_L = \frac{(X_L + X_R)f_e}{Z_e} \quad (4)$$

$$\frac{X_c}{X_e} = \frac{B_c}{B_e}. \quad (5)$$

Change in Surface Orientation θ.
The surface orientation, given by angle $\theta_c$, is $$\theta_c = \tan^{-1}\left(\frac{p_z - q_z}{p_x - q_x}\right). \quad (6)$$

The perceived orientation $\theta_e$ is $$\theta_e = \tan^{-1}\left(\frac{p_{z,e} - q_{z,e}}{p_{x,e} - q_{x,e}}\right). \quad (7)$$

Since $$\frac{p_{z,e} - q_{z,e}}{p_z - q_z} = \frac{B_e f_e}{B_c f_c} \text{ and } \frac{p_{x,e} - q_{x,e}}{p_x - q_x} = \frac{B_e}{B_c}, \quad (8)$$

the perceived surface orientation can be computed by $$\theta_e = \tan^{-1}\left(\frac{f_e}{f_c} \frac{p_z - q_z}{p_x - q_x}\right). \quad (9)$$

These relationships can be used to create special stereo effects for a viewer. These include cardboarding and pinching, and gigantism and miniaturization, among others. Some of these effects are explained in more detail below.

1.2.1. Cardboarding and Pinching

Using the relationship described above, special effects of cardboarding and pinching can be created. For example, let the camera and eye interocular (baseline) be identical ($B_c = B_e$) and let only the focal length of the cameras, $f_c$, vary.

$$\text{For } X: \quad (10)$$
$$X_c = X_e.$$

$$\text{For } Z: \quad (11)$$
$$\frac{Z_e}{Z_c} = \frac{f_e}{f_c}.$$

$\theta_c$ is given by (6) while $\theta_e$ is given by (9).

When the camera focal length $f_c$ is larger than the eye focal length $f_e$, $\theta_e$ decreases and $Z_e$ decreases: the object appears closer and flatter. This is called cardboarding. The opposite happens when the camera focal length is small. Here the object appears farther away and stretched, which is called pinching.

1.2.2. Gigantism and Miniaturization

The special effects of gigantism and miniaturization can also be created by using the stereo movie editing technique described herein. For example, let the camera and eye focal lengths be identical ($f_c = f_e$) and let only the baseline or interocular of the cameras, $B_c$, vary.

$$\text{For } X: X_c = X_e \frac{B_c}{B_e}. \quad (12)$$

$$\text{For } Z: Z_c = Z_e \frac{B_c}{B_e}. \quad (13)$$

$$\text{For } \theta_e, \text{ from (6), } f_c = f_e, \text{ and (9): } \theta_e = \theta_c. \quad (14)$$

When the camera baseline $B_c$ is larger than the eye baseline (interocular) $B_e$, the object appears to shrink. This is called miniaturization. The opposite happens when the camera baseline is small. Here the object appears scaled up, the effect of which is called gigantism.

1.3 Exemplary Architecture Employing the Stereo Movie Editing Technique.

Figure 2:
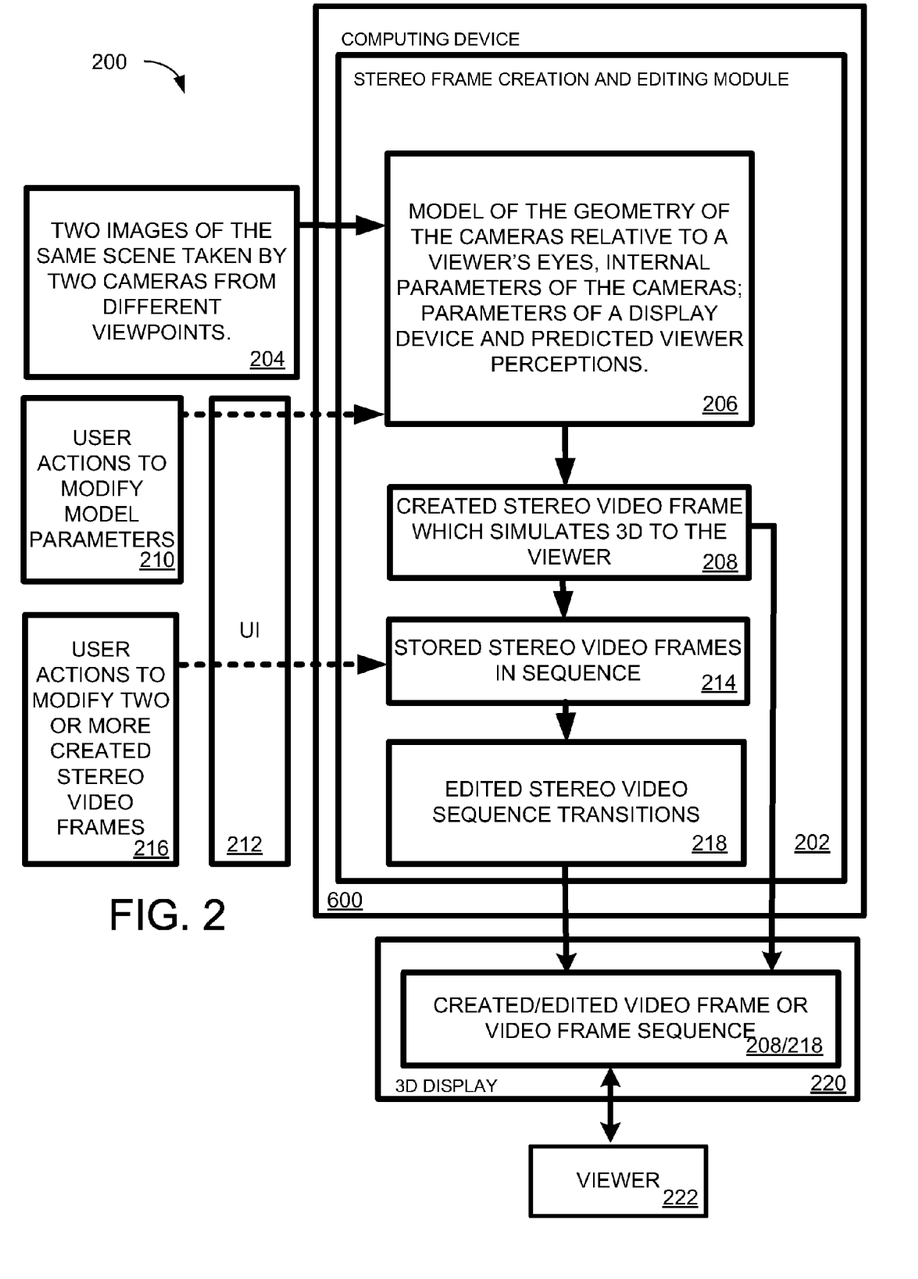
FIG. 2 is a diagram depicting one exemplary architecture in which one embodiment of the stereo movie editing technique can be practiced.

FIG. 2, provides one exemplary architecture 200 in which one embodiment of the stereo movie editing technique can be practiced. This architecture 200 includes a stereo frame creation and editing module 202 that resides on a computing device 600, such as will be described in more detail with respect to FIG. 6.

Two images of the same scene taken by two cameras from different viewpoints 204 are input into a model of the geometry of the cameras relative to a viewer's eyes 206 created using internal parameters of the cameras, the parameters of a 3D display device and predicted viewer perceptions. The model 206 is used to create a stereo video frame 208 which simulates a three-dimensional view of the scene captured by the cameras to a viewer. The stereo frame consists of a left view and a corresponding right view. User actions 210 via a user interface 212 can also be used to modify the parameters of the model in order to create variations of the created stereo video frame 208. The created and/or modified video frames can be stored in sequences 214.

User actions 216 can also be input to modify two or more of the created or modified stereo video frames 214 in order to create edited stereo video sequence transitions 218.

The created and edited video frame 208 or video frame sequence 218 can then be output to a 3D display 220, to be viewed in three dimensions by a viewer 222.

1.4 Exemplary Process Employing the Stereo Movie Editing Technique.

Figure 3:
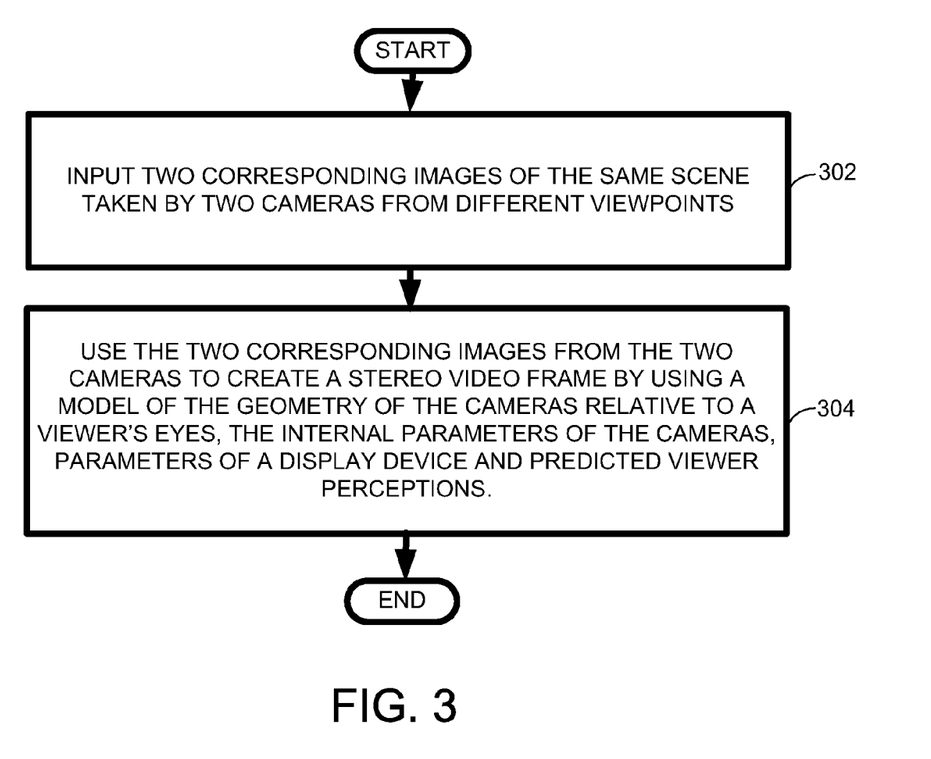
FIG. 3 is a flow diagram depicting an exemplary embodiment of a process employing one embodiment of the stereo movie editing technique.

An exemplary process employing the stereo movie editing technique is shown in FIG. 3. Two corresponding images of the same scene taken by two cameras from different viewpoints are input, as shown in block 302. The two corresponding input images from the two cameras are used to create a stereo video frame by using a model of the geometry of the cameras relative to a viewer's eyes, the internal parameters of the cameras, parameters of a display device and predicted perceptions, as shown in block 304. It should be noted that the created video frame can be changed by varying the parameters of the model. Additionally, sequences of created or edited video frames can be edited to ensure smooth transitions between sequences of images.

It should be noted that many alternative embodiments to the discussed embodiments are possible, and that steps and elements discussed herein may be changed, added, or eliminated, depending on the particular embodiment. These alternative embodiments include alternative steps and alternative elements that may be used, and structural changes that may be made, without departing from the scope of the disclosure.

2.0 Exemplary User Interfaces for Digital Manipulation of Stereoscopic Parameters for Editing Employed in the Stereo Movie Editing Technique.

Figure 4:
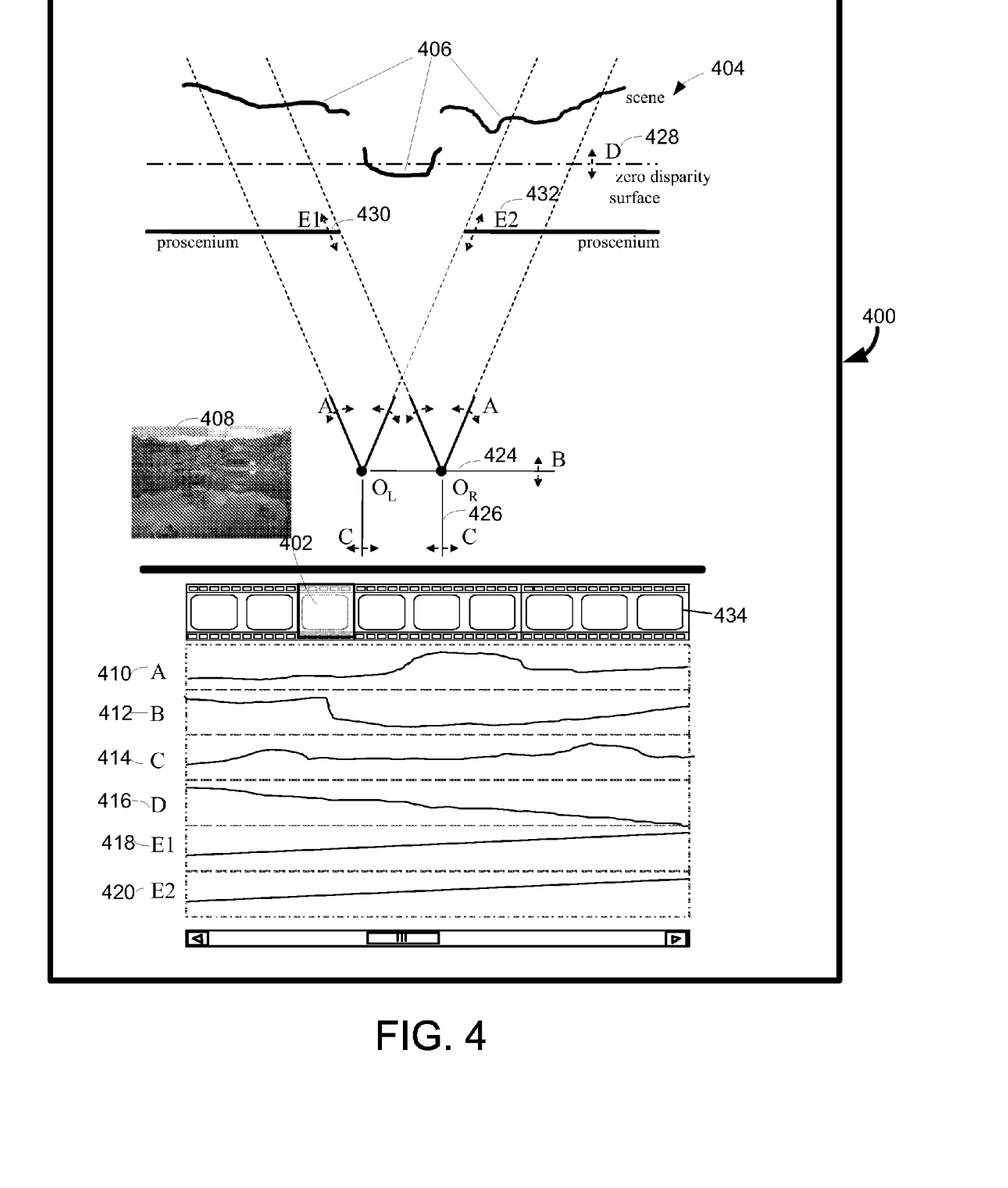
FIG. 4 depicts an exemplary User Interface (UI) employed by one exemplary embodiment of the present stereo movie editing technique.
Figure 5:
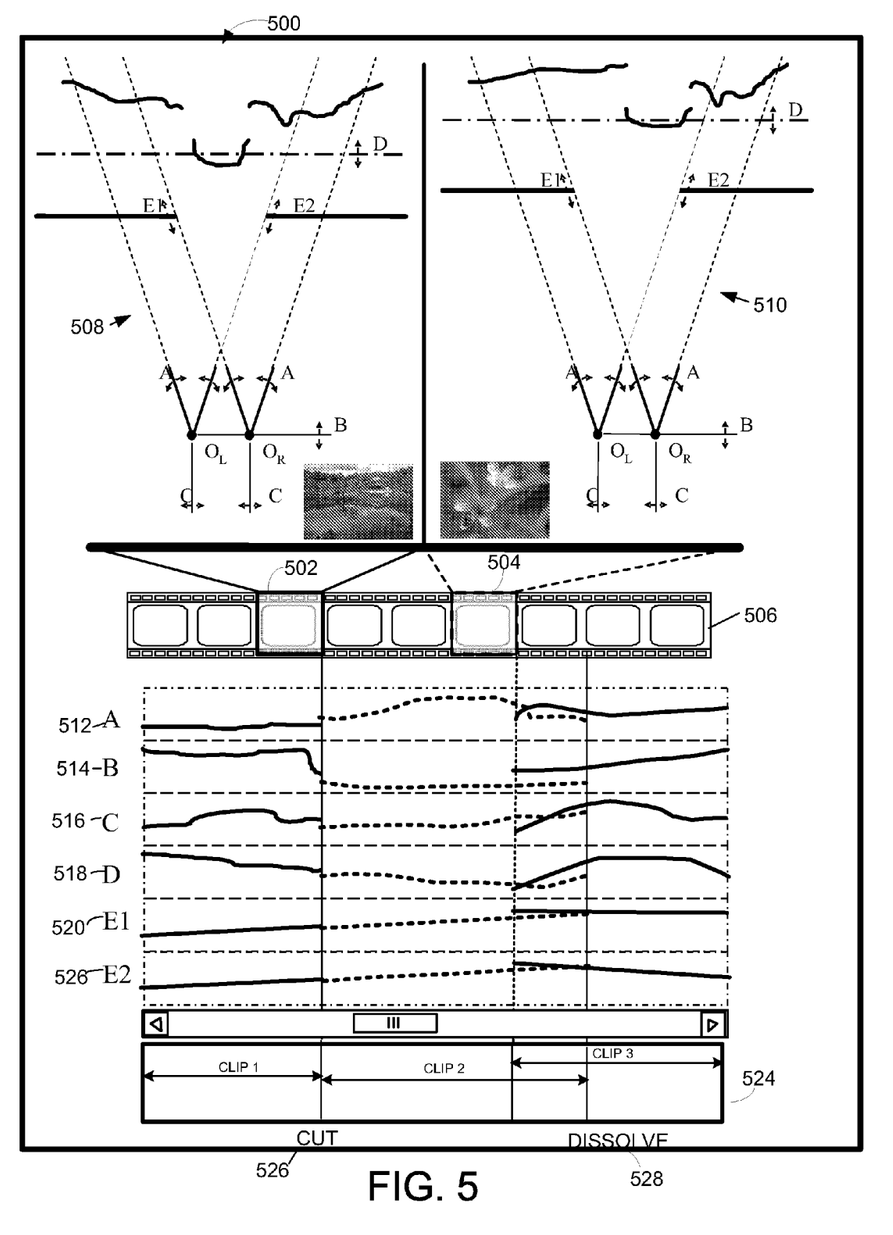
FIG. 5 depicts another exemplary UI of the stereo movie editing technique described herein for two movie frames. The user has the option of selecting two frames (highlighted in boxes along the film strip), manipulating parameters independently, and having the system transition the parameters towards each other for more seamless viewing.

The stereo movie editing technique described herein can employ a single frame editing user interface (UI), as shown in FIG. 4, 400, and a multiple frame editing UI, as shown in FIG. 5, 500. These will be discussed in the paragraphs that follow.

2.1 Single Frame Editing UI

In FIG. 4, one exemplary user interface 400 for using the stereo movie editing technique is shown. FIG. 4 shows the interface when the user selects only a single stereo video frame of a sequence of stereo frames (e.g., selected from frame selection region 434) created by a stereographic camera, for example by using a pointing device such as a mouse. The user is able to manipulate parameters for the selected stereo video frame to include A: field of view of left and right cameras, B: location of cameras from scene (dolly in/out), C: interocular distance, D: vergence (which controls the location of the surface on the scene where disparity between left and right views is zero), and E1 and E2: locations of proscenium (to prevent significant changes in left/right views at the frame edges). E1 and E2 can be manipulated independently. Note that these parameters can be manipulated over time as illustrated in the lower half of FIG. 4.

The UI 400 provides a "bird's eye" view region 402 where a bird's eye view of a virtual camera setup of the stereo camera that captured the selected stereo frame, including a point cloud 406 of objects in the scene being viewed, is displayed. This point cloud 406 is achieved by reconstructing the scene using a stereo algorithm (such as, for example, the one described with respect to FIGS. 1, 2 and 3). To compute this point cloud, one can use the segment-based stereo technique described by Zitnick et al. The values of B (dolly in/out) and D (vergence) are relative values, and are initially set to zero (i.e., no change), while C is set to 1 initially. The default location of D can be the average distance of the scene from the cameras. If the cameras have been pre-calibrated, A (field of view of cameras) is set to the calibrated value. Otherwise, it is set to an approximate value (say 45 degrees). E1 and E2 (locations of proscenium) are computed based on the scene depths over the length of the clip; for example, they can be set to the minimum depths on the left and right sides, respectively. This representation of the scene allows an intuitive way of changing different stereo parameters. Changes to the selected stereo frame 402 are reflected in a small resultant image 408 displayed on the UI 400. In addition, a user can also view the previous and next video frames to specify scene transitions. In the rest of this section the different parameters that can be changed digitally are outlined. These parameters can be changed by changing the respective points A, B, C, D, E1 and E2 in the bird's eye region 402 (e.g., by selecting a point and dragging it with an input device or by changing the value of each of the parameters displayed with respect to time 410, 412, 414, 416, 418 and 420, below the bird's eye region 402). These parameters include field of view A, dolly in/out B, interocular distance C, vergence D, and proscenium arch E1, E2.

2.1.1 A: FOV (Field of View).

Using the UI 400, in one embodiment, a user can change the field of view 422 by varying the focal length of the cameras in the bird's eye region 402 of the UI 400. This causes stretching or flattening effect of an object, as explained previously. A user can also change the field of view by changing the value of the focal length A of the cameras in the field of view region 410 of the UI.

2.1.2 B: Dolly In/Out.

Using the dolly in/out capability of UI 400, in one embodiment, once the scene is reconstructed using the segment-based stereo technique described in Zitnick et al. described previously, a user can also move the locations of the cameras B 424 forward or backwards in the bird's eye view region 402 and obtain a new view of the scene 408 with different disparities. This increases or decreases the size of the objects on the screen, and is useful for the user to change the central focus of the viewer. Changes to the location of the cameras can also be made by a user by changing the value of B displayed in the dolly in/out region 412.

2.1.3 C: Interocular.

The interocular or the baseline refers to the distance between the cameras. In one embodiment of the stereo movie editing technique, a stereo algorithm that is employed allows a user to interpolate between the distance between cameras C 420 (for example, by changing the position of C 420 by clicking and dragging with a computer input device) and obtaining a new image. For example, the user can effectively move the cameras closer, which allows a user to scale the perceived object size upwards. A user can also change the distance between cameras C by changing the value of C displayed in the interocular region 414 of the display.

2.1.4 D: Vergence

Vergence refers to the location where the eyes converge, which is the position of the screen. Moving the right and left images relative to each other moves the screen either forward or backward. It also results in a pinching/flattening effect similar to cardboarding. Vergence is effectively a global translation to all the disparities in the stereo pair. However, a user editing a stereo clip can also select an object in the bird's eye region 402 using the UI 400 and verge on it. This is equivalent to generating zero disparity surface D 428 passing through the object as shown in FIG. 4. To change the vergence, the user clicking on the zero disparity surface D 428 and dragging it up (decreasing the vergence) or down (increasing the vergence). The average disparity of this object can be computed, which helps in the placement of the zero disparity surface. The user can also change the vergence by changing the value of D displayed in the vergence region 416 of the display.

2.1.5 E1 and E2: Proscenium Arch.

A proscenium arch removes the region that is only viewed by one camera. Usually this can be done manually. However, the stereo movie editing technique described herein can also do it automatically for a particular object. The user can select an object in the bird's eye view region 402 and the stereo movie editing technique will automatically set the proscenium arch E1 430 and E2 432 for it. This is done to reduce visual discomfort when attempting to fuse visual information at the sides of the stereo frame. The user can also change the values E1 and E2 of the proscenium arches by changing the values of E1 and E2 displayed in proscenium regions 418 and 420.

2.2 User Interface for Creating Transition Effects for Multiple Frames in Stereo Movies An important effect in a movie editor is cutting between shots. This is because many times a story is told by switching between contrasting scenes. Also, recent trends in movie creation have tended towards more cuts and shorter scenes. For 3D movies the potential for headaches and other types discomfort in these cases is large. In addition, the audience attention can wander around a 3D movie the same way it can move around a real 3D scene. One implementation of the stereo editing technique's UI is designed to facilitate the transition effects in stereo movies.

2.2.1 Comfortable Transitions.

One of the things that make stereo transitions difficult is that the disparities for the objects between clips can be different. This results in a 'jump' as the viewer quickly readjusts. The stereo editing technique described herein allows a user to select an object in the previous and next clip and select a disparity. Then the technique will change the vergence such that at the cut, the two objects have the same disparity.

2.2.2 Controlling Attention.

There may be many objects in the cut. Therefore, the user may want to control where the person viewing the stereo video is looking. One way to do this is to have very low disparity for the object of interest. For example, to change the disparity to a low disparity the editor can use the dolly in/out parameters of the UIs 400, 500 depicted in FIGS. 4 and 5. This allows the viewer to fuse that object first and directs attention.

2.2.3 Gradually Increasing Disparity.

Many viewers may not be able to fuse a scene quickly. It may be necessary to start very flat and then expand out. Doing this editing in real life can be time consuming and painful. Instead, the technique can do this by taking the middle two interpolated views which are almost flat and slowly expanding outwards. Again, this can be done by changing the disparity using the dolly in/dolly out function of the UIs of FIGS. 4 and 5. Another way is to insert the object into the Panum's area by decreasing the vergence and letting the user fuse.

2.3 Exemplary User Interface for Transitions Between Frame Sequences

FIG. 5 depicts another exemplary UI and controls of the stereo movie editing technique described herein for two frames. More specifically, FIG. 5 provides a UI 500 for two selected stereo video frames 502, 504 which are displayed in frame regions 508, 510 similar to the one displayed in FIG. 4. The UI 500 also allows an editor to edit the parameters for each selected stereo video frame. The user has the option of selecting two frames (highlighted in boxes along the film strip 506) and manipulating the parameters of field of view A, dolly in/out B, interocular distance C, vergence D, and proscenium arch E1, E2 for each, in a manner as described with regard to UI 400 of FIG. 4, in either the bird's eye regions 508, 510, or in the regions depicting each of the parameters versus time 512, 514, 516, 518, 520, 522. The user also has the possibility of manipulating the parameters for each selected stereo video frame independently, (also in a manner similar to that described in FIG. 4).

UI 500 can be used to transition the above-discussed parameters of each of the two selected frames towards each other for more seamless viewing. FIG. 5, 524, provides two examples of time-based editing where the technique cuts from one scene sequence to the next 526, and where the technique dissolves from one scene sequence to the next using the technique.

3.0 The Computing Environment

The stereo movie editing technique is designed to operate in a computing environment. The following description is intended to provide a brief, general description of a suitable computing environment in which the stereo movie editing technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 6:
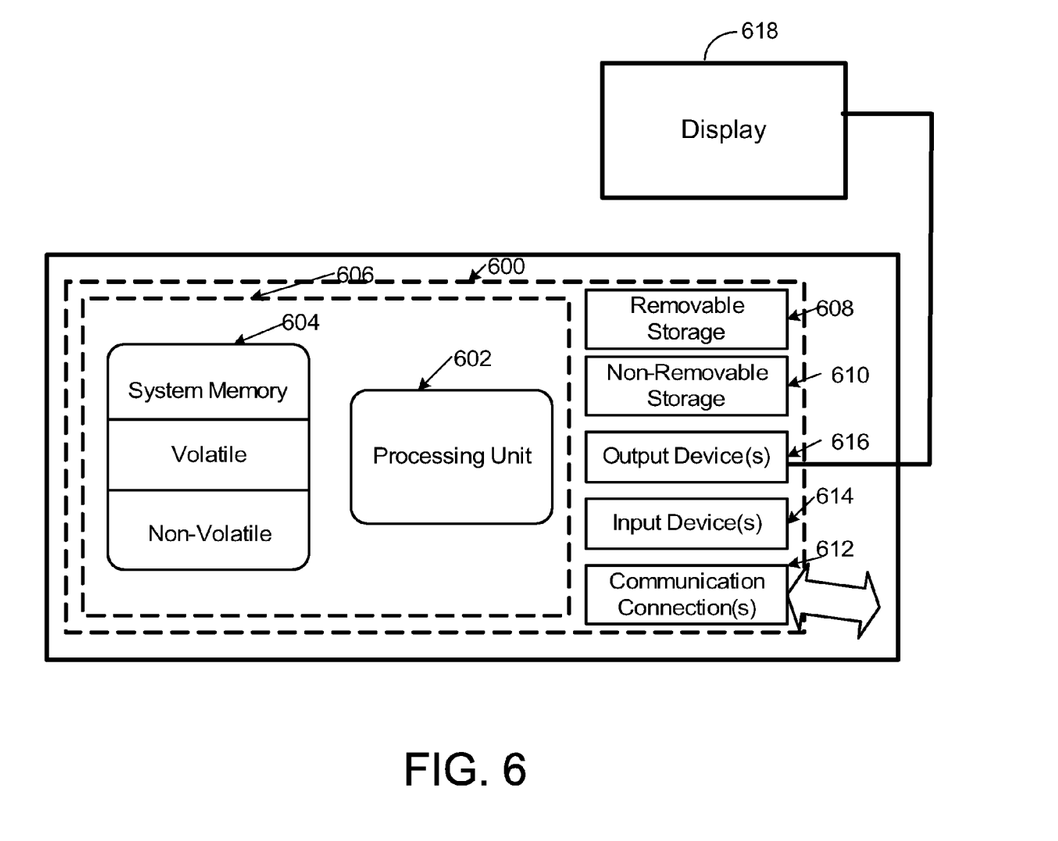
FIG. 6 is a schematic of an exemplary computing device in which the stereo movie editing technique can be practiced.

FIG. 6 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 6, an exemplary system for implementing the stereo movie editing technique includes a computing device, such as computing device 600. In its most basic configuration, computing device 600 typically includes at least one processing unit 602 and memory 604. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, device 600 may also have additional features/functionality. For example, device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer readable instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 600. Any such computer storage media may be part of device 600.

Device 600 may also contain communications connection(s) 612 that allow the device to communicate with other devices. Communications connection(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 600 may have various input device(s) 614 such as a display, a keyboard, mouse, pen, camera, touch input device, and so on. Output device(s) 616 such as speakers, a printer, and so on may also be included. All of these devices are well known in the art and need not be discussed at length here.

The stereo movie editing technique may be described in the general context of computer-executable instructions, such as program modules, being executed by a computing device. Generally, program modules include routines, programs, objects, components, data structures, and so on, that perform particular tasks or implement particular abstract data types. The stereo movie editing technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for creating stereo video, comprising:
   using a computing device for:
   inputting corresponding images of the same scene taken by two cameras at the same distance but from different viewpoints, wherein the images in a viewer's eyes and the two corresponding images in the cameras are the same; and
   using the corresponding images from the two cameras to create a stereo video frame by using a model of the geometry of the cameras relative to a viewer's eyes, internal parameters of the cameras, parameters of a display device and predicted viewer perceptions to predict how changes in various parameters in the camera configuration are perceived by the viewer, wherein the model employs, for any point in the corresponding images the relationships of change in depth, change in x coordinates and change in surface orientation to create the stereo video frame, wherein for two points in the scene, $P=(p_x,p_y,p_z)$, $Q=(q_x,q_y,q_z)$, the corresponding perceived points are $P_e=(p_{x,e},p_{y,e},p_{z,e})$, and $Q_e(q_{x,e},q_{y,e},q_{z,e})$ and wherein the surface orientation, given by angle $\theta_c$, is $$\theta_c = \tan^{-1}\left(\frac{p_z - q_z}{p_x - q_x}\right),$$

and wherein the perceived surface orientation given by angle $\theta_e$ is computed by $$\theta_c = \tan^{-1}\left(\frac{f_e}{f_c}\frac{p_z - q_z}{p_x - q_x}\right),$$

where $f_c$ is the focal length of the cameras and $f_e$ is the eye focal length.

2. The computer-implemented process of claim 1 wherein the predicted viewer perceptions further comprise capacity for vergence, a brain's ability to perceived depth in a single image, and fusion, a brain's ability to perceive depth from two images of a scene taken from slightly different view points.

3. The computer-implemented process of claim 1 wherein the geometry of the camera is rectified so that the input images are processed to produce an epipolar geometry that is horizontal scan lines in one camera's image mapping to horizontal scan lines in the other camera's corresponding image.

4. The computer-implemented process of claim 1 wherein the model determines the disparity, the difference in image location as seen by the right and left eyes, by employing the distance between cameras, the focal length of the cameras and a depth of two points and an angle in each of the images obtained from the two cameras.

5. The computer-implemented process of claim 1 wherein for any point P in the input images a viewer's perception of change in depth of the point, perceived change in x coordinates of the point P and the perceived surface orientation at the point P is computed using the model.

6. The computer-implemented process of claim 1 wherein the model is used to make an object in the images appear closer and flatter to the viewer when camera focal length is greater than eye focal length of the viewer.

7. The computer-implemented process of claim 1 wherein the model is used to make an object in the images appear farther away and stretched to the viewer when camera focal length is smaller than the eye focal length of the viewer.

8. The computer-implemented process of claim 1 wherein the model is used to make an object in the images appear to shrink to the viewer by making camera baseline, the distance between cameras, larger than the eye baseline the distance between eyes of the viewer.

9. The computer-implemented process of claim 1 wherein the model is used to make an object in the images appear to become larger to the viewer by making a camera baseline, the distance between cameras, smaller than an eye baseline, the distance between eyes of the viewer.

10. A user interface for editing stereo video, comprising:
a display with regions, the regions comprising for a selected input stereo video frame:
a frame selection region for selecting an input stereo video frame from a sequence of stereo video frames;
a bird's eye view region of the geometry of a camera set up used to capture the selected input stereo video frame and an associated point cloud of objects in the scene in the selected input stereo video frame;
a field of view region for displaying and manipulating a left camera field of view and a right camera field of view that captured the selected input stereo video frame;
a dolly in/out region for displaying and manipulating the distance from the point cloud to the left and right cameras that captured the selected input stereo frame;
an interocular region for displaying and manipulating the interocular distance between the left and right camera that captured the selected input video frame;
a vergence region for displaying and manipulating the location of the source on the scene where disparity between left and right camera views is zero;
an E1 proscenium region for displaying and manipulating the region of the scene that is viewed by only the left camera;
an E2 proscenium region for displaying and manipulating the region that is viewed by only the right camera;
a resultant image that displays any changes made to the input stereo frame; and
a user input device for manipulating the regions of the display in order to change the input stereo video frame.

11. The user interface of claim 10 wherein the user input device changes values in the field of view region, dolly in/out region, interocular region, vergence region, E1 proscenium region, and E2 proscenium region.

12. The user interface of claim 10 further comprising a resultant image displayed on the display that reflects changes made to the selected input stereo video frame.

13. The user interface of claim 10 wherein the bird's eye view region of the camera geometry further comprises controls for changing field of view, distance between left and right cameras to the point cloud, interocular distance between cameras, the vergence, a left proscenium and a right proscenium.

14. The user interface of claim 12 wherein the user input device manipulates the controls in order to change the selected input video frame.

15. A user interface for editing multiple video frames, comprising:
a display a frame selection region for selecting a first and a second input stereo video frame from a sequence of frames;
a first frame region displaying the first selected stereo video frame and second frame region displaying the second selected stereo video frame, each frame region comprising:
a bird's eye view region of the geometry of a camera set up used to capture the selected input stereo video frame and an associated point cloud of the scene in the selected input stereo video frame;
a field of view region for displaying and manipulating a left camera field of view and a right camera field of view that captured the selected input stereo video frame;
a dolly in/out region for displaying and manipulating the location of the left and right cameras that captured the selected input stereo video frame;
an interocular region for displaying and manipulating the interocular distance between the left and right camera that captured the selected input video frame;

a vergence region for displaying and manipulating the location of the source on the scene where disparity between left and right camera views is zero;

an first proscenium region for displaying and manipulating the region of the scene that is viewed by only the left camera;

an second proscenium region for displaying and manipulating the region that is viewed by only the right camera; and a user input device for manipulating the first and second frame regions of the display.

16. The user interface of claim 15 further comprising using the user input device in order to manipulate the first and second frame regions in order to specify transitions between a first stereo video frame sequence and a second stereo frame sequence.

17. The user interface of claim 15 further comprising selecting the same object in the first selected stereo video frame and the second selected stereo video frame and changing vergences to be the same in each of the first and second selected stereo video frames in order to ensure smooth transitions between the first and second stereo video frames to the viewer.

18. The user interface of claim 15 further comprising controlling a viewer's attention by using a low disparity for an object of interest in the first selected stereo video frame compared to a second selected stereo video frame.

19. The user interface of claim 15 further comprising reducing or enhancing stereo movie effects of cardboarding and miniaturization in one of the two input stereo video frames by changing controls in the field of view region, the dolly in/out region, the interocular region, the vergence region, the first proscenium region or the second proscenium region.

20. The user interface of claim 15 further comprising using a model comprising the geometry of a stereo camera that captured the first and second stereo video frames relative to a viewer's eyes, internal parameters of a camera the captured the first and second selected stereo video frames, parameters of a display device and predicted viewer perceptions.

\* \* \* \* \*